(12) United States Patent
Lam

(10) Patent No.: US 6,721,129 B2
(45) Date of Patent: Apr. 13, 2004

(54) LOW FREQUENCY ATTENUATOR IN A MAGNETIC WRITE HEAD

(75) Inventor: Quan-chiu Harry Lam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 09/917,135

(22) Filed: Jul. 27, 2001

(65) Prior Publication Data

US 2003/0021050 A1 Jan. 30, 2003

(51) Int. Cl.[7] ............................ G11B 5/23; G11B 5/127
(52) U.S. Cl. ..................... 360/119; 360/125; 360/126
(58) Field of Search ............................... 360/121, 125, 360/122, 119, 120, 128, 115, 131, 127, 123, 126, 46

(56) References Cited

U.S. PATENT DOCUMENTS

| | | | |
|---|---|---|---|
| 4,819,107 A | | 4/1989 | Bolt |
| 4,849,841 A | * | 7/1989 | Sokolik .................. 360/119 |
| 4,935,832 A | * | 6/1990 | Das et al. ................ 360/112 |
| 4,954,921 A | * | 9/1990 | Bolt ........................ 360/121 |
| 5,255,141 A | * | 10/1993 | Valstyn et al. .......... 360/321 |
| 5,270,895 A | * | 12/1993 | Ruigrok et al. ......... 360/126 |
| 5,434,733 A | * | 7/1995 | Hesterman et al. ..... 360/318.1 |
| 5,436,779 A | | 7/1995 | Valstyn |
| 5,546,255 A | * | 8/1996 | Colineau ................. 360/115 |
| 5,949,624 A | * | 9/1999 | Simmons et al. ....... 360/318.1 |
| 5,973,890 A | * | 10/1999 | Lehureau et al. ....... 360/122 |
| 6,369,983 B1 | * | 4/2002 | Hong ...................... 360/126 |
| 6,473,276 B1 | * | 10/2002 | Chang et al. ........... 360/317 |
| 2002/0191349 A1 | * | 12/2002 | Hsu et al. ................ 360/317 |

OTHER PUBLICATIONS

Encoding Technique, Apr. 1, 1970. IBM Technical Disclosure Bulletin, Volume No. 12, pp. 1816–1817.*

* cited by examiner

Primary Examiner—David Hudspeth
Assistant Examiner—Natalia Figueroa
(74) Attorney, Agent, or Firm—John J. Oskorep

(57) ABSTRACT

A magnetic write head configured for high data rate operation has first and second pole pieces, a write gap formed between the first and second pole pieces, and at least one long and narrow magnetic column extending between the first and second pole pieces which is magnetically in parallel with the write gap. The magnetic column serves as a low frequency attenuator in the magnetic write head as it shunts magnetic flux excess away from the write gap at low frequencies. Thus, the magnetic write head is configured to write data at a high data rate where a sufficient magnetic flux is produced at the write gap, and configured to write data at a low data rate where the at least one magnetic shunting element shunts magnetic flux excess so that a reduced magnetic flux is produced at the write gap. This reduced low frequency or DC magnetic flux does not exceed the maximum flux level beyond which excessive side-writing and adjacent track interference (ATI) would otherwise begin to occur.

23 Claims, 7 Drawing Sheets

LOW FREQUENCY ATTENUATOR IN A MAGNETIC WRITE HEAD

BACKGROUND OF THE INVENTION

1. Field of the Invention

The present invention relates generally to magnetic heads in disk drives, and more particularly to magnetic write heads configured to write data at high data rates.

2. Description of the Related Art

Prior art magnetic write heads have serious impediments for writing data at today's ever-increasing high data rates. Such write heads either cannot produce enough magnetic flux within the short cycle times available during high frequency operation to write sufficiently to a storage medium or, if structurally compensated to produce enough flux to write sufficiently during high frequency operation, they tend to produce excessive flux during low frequency operation such as to cause undesirable side-writing or adjacent track interference (ATI).

To illustrate, FIG. 1 is a planar view of a conventional magnetic write head 100 for writing to a storage medium, such as a disk 102, wherein the driving coil is omitted from the diagram for clarity. Write head 100 is made from pole pieces which form a write gap 104 at an air bearing surface (ABS), where magnetic flux is produced for writing data to disk 102. Write head 100 has a flare point 106 and a flare angle 108 with dimensions that may not be sufficient for writing at high data rates. That is, the magnetic flux that can be produced at write gap 104 within the short cycle times available during high data rate operation is not sufficient to write data to disk 102, especially at today's high level of disk coercivity (e.g., 4000 Oersteds or greater).

In FIG. 2, a magnetic write head 200 which is configured to sufficiently write data to disk 102 at high data rates is shown. The high data rate may be, for example, one that is greater than or equal to 500 MHz. Similar to write head 100 of FIG. 1, write head 200 has a flare point 206 and a flare angle 208. However, so that write head 200 can sufficiently write at a high data rate, flare point 206 of write head 200 is shorter in length than flare point 106 of write head 100 (i.e., the flare point is closer to the ABS), and/or flare angle 208 of write head 200 is greater than flare angle 108 of write head 100. For example, flare point 106 of write head 100 is 1.0–1.5 μm whereas flare point 206 of write head 200 is 0.5–1.0 μm, and flare angle 108 of write head 100 is 30° whereas flare angle 208 of write head 200 is 60°.

Although write head 200 is capable of producing adequate flux to write at high data rates, it may produce excessive flux when writing at low data rates which tends to cause undesirable side-writing and interference on disk 102. This is because the magnetic materials making up the pole pieces (i.e., the wide magnetic core or "yoke" in the back, and the relatively narrow pole tips in the front) have a magnetic permeability that is frequency-dependent and decreases as the operating frequency increases. Put another way, the efficiency of a conventional write head is much better at low frequencies than it is at high frequencies. This phenomenon will be referred to herein as "efficiency roll-off" of the write head.

To further illustrate this low frequency situation, FIG. 3 shows a pole tip view of write head 200 of FIG. 2 which reveals a pole piece 302 (e.g., P2) and a pole piece 304 (e.g., P1) forming write gap 204. In this example, write head 200 is writing data at a low data rate where magnetic fluxes 306 are undesirably produced excessively in areas away from write gap 204. This is likely to cause interference to other data written on adjacent tracks on disk 102. Unfortunately, write head 200 may therefore not be usable since it will overwrite and erase where it should not be doing so, resulting in a large erase-band and high level of ATI. This problem is only exacerbated by today's required high recording density and, in particular, a large number of tracks-per-inch. For example, today's high recording density is greater than 50 kilotracks per inch (KTPI).

Referring to FIGS. 4A–4C, timing diagrams related to the production of magnetic flux at write gap 204 of write head 200 of FIG. 2 are shown. These diagrams help to illustrate the interference issues that must be considered when using the geometry of high-frequency write head 200. More particularly, FIG. 4A is a timing diagram for high frequency operation; FIG. 4B is a timing diagram for low frequency operation; and FIG. 4C is a timing diagram for DC operation (lowest frequency=0 MHz which is typical for data erasure). The binary write current sequencing scheme used throughout FIG. 4 is represented in the well-known Non-Return-to-Zero (NRZ) format, where "1" represents one current or magnetization direction and "0" represents the opposite direction.

In FIG. 4A, a data signal 402 represents high speed data in binary form ('1' for binary one and '0' for binary zero) to be written to disk 102, and a flux signal 404 represents magnetic flux which appears at write gap 204 of write head 200 to write the high speed data to disk 102. As illustrated, data signal 402 reflects the binary write current sequence "10101010" to be written to disk 102. Data signal 402 has a frequency for writing data to disk 102 at a high data rate, which may be any suitable data rate that is higher than the nominal rate or average rate of writing using write head 200. This high data rate may be the maximum operating frequency of write head 200, which exists when bit transitions ("1" to "0" or "0" to "1") occur for each one of a plurality consecutive cycles. The high data rate may be, for example, 500 MHz or greater, or even 1 GHz or greater. As a result of writing at the high data rate, flux signal 404 peaks at a high data rate flux level, which is desirably lower than a maximum flux level beyond which excessive side-writing and interference with other data tracks on disk 102 would tend to occur.

In FIG. 4B, a data signal 406 represents low speed data in binary form to be written to disk 102, and a flux signal 408 represents the magnetic flux which appears at write gap 204 of write head 200 to write this low speed data to disk 102. As illustrated, data signal 406 reflects the binary write current sequence "11001100" to be written to disk 102. In contrast to data signal 402 of FIG. 4A, data signal 406 of FIG. 4B has a frequency for writing to disk 102 at a low data rate, which may be any suitable data rate that is less than or equal to the nominal rate or average rate of writing using write head 200. This particular example reflects a data rate that is half of the high data rate described in relation to FIG. 4A. Referring to the previous example of FIG. 4A, the low data rate may be 250 MHz or less. As a result of writing at this low data rate, flux signal 408 may peak at or exceed the maximum flux level, beyond which excessive side-writing and interference with other data on disk 102 tends to occur. In FIG. 4C, a data signal 410 illustrates DC operation (binary data sequence of "11111111") which also causes flux signal 412 to peak or exceed the maximum flux level at which interference tends to occur.

For a write head that has been structurally compensated for high data rates, excessive flux generation during low data rate operation is very likely to happen. This is due to the efficiency roll-off phenomenon previously referred to: a write head configured to have good efficiency at a high data rate will have an even higher—perhaps even excessively higher—efficiency at a low data rate.

Thus, as shown and described in relation to FIGS. 2–4, a write head that is geometrically configured so that sufficient flux is produced during high data rate operation tends to cause excessive side-writing or ATI during low data rate or DC operation. Accordingly, what is needed is a magnetic head that has the ability to write data at high data rates but also produces minimal interference when writing data at low data rates.

SUMMARY OF THE INVENTION

A magnetic head configured for high data rate operation has first and second pole pieces (which include the wide magnetic core or "yoke" in the back, and the relatively narrow pole tips in the front), a write gap formed between the first and second pole pieces, and at least one magnetic shunting element extending between the first and second pole pieces which is magnetically in parallel with the write gap. The at least one magnetic shunting element serves as a low frequency attenuator in the magnetic head.

The magnetic head is configured to write data at a high data rate where a sufficient magnetic flux is produced at the write gap, and configured to write data at a low data rate where the at least one magnetic shunting element shunts magnetic flux excess so that a reduced magnetic flux is produced at the write gap. This reduced low frequency or DC magnetic flux does not exceed the maximum flux beyond which excessive side-writing and adjacent track interference (ATI) would otherwise begin to occur.

Thus, excessive magnetic flux is advantageously shunted by the at least one magnetic shunting element to reduce interference that would otherwise occur when writing at the low data rate, but not when writing at the high data rate where additional magnetic flux is needed for sufficient writing.

DETAILED DESCRIPTION OF THE PREFERRED EMBODIMENTS

According to the present invention, a magnetic head configured for high data rate operation has first and second pole pieces, a write gap formed between the first and second pole pieces, and at least one magnetic shunting element extending between the first and second pole pieces which is magnetically in parallel with the write gap. The at least one magnetic shunting element serves as a low frequency attenuator in the magnetic head.

The magnetic head is configured to write data at a high data rate where a sufficient magnetic flux is produced at the write gap, and configured to write data at a low data rate where the at least one magnetic shunting element shunts magnetic flux excess so that a reduced magnetic flux is produced at the write gap. While still sufficient to write data properly, this reduced low frequency or DC flux does not exceed the maximum flux level beyond which excessive side-writing and adjacent track interference (ATI) would otherwise begin to occur.

Advantageously, excessive magnetic flux is shunted by the at least one magnetic shunting element to reduce side-writing and ATI when writing at the low data rate, but not when writing at the high data rate where additional magnetic flux is needed for sufficient writing (i.e. for sufficient "overwrite" capability at high data rates).

This magnetic shunting element shunts magnetic flux excess at low frequencies but not at high frequencies due to its higher magnetic permeability at low frequencies. The ratio of length-to-width ("aspect ratio") of the shunting element will determine the rate of decrease of its magnetic permeability with increasing operating frequency, referred to herein as the "frequency roll-off" of its permeability. The frequency roll-off depends on the eddy current induced by the high frequency signals as well as the relative immobility of the magnetic domain walls in the shunting element at high frequencies. The extent to which these two factors will roll-off the magnetic permeability will depend accordingly on the ratio of the length-to-width. Thus, the most suitable ratio of length-to-width can be determined during the design stage of the write head to achieve most any particular result.

Figure 5:
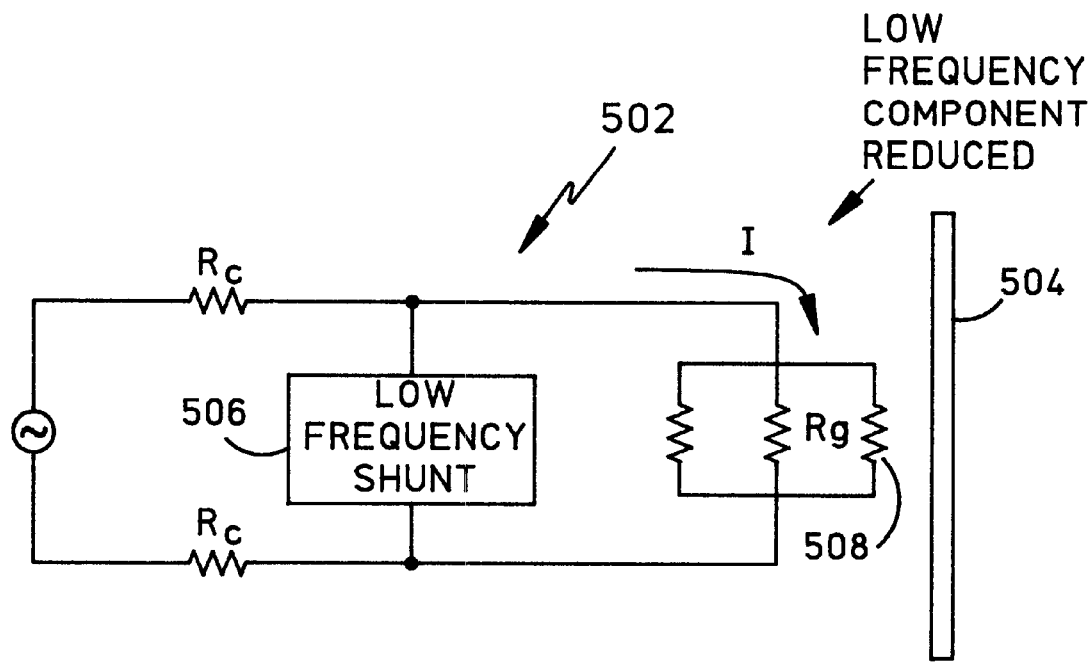
FIG. 5 is an electrical equivalent circuit of a magnetic write head that is configured in accordance with the present invention.

FIG. 5 is an illustrative representation of a magnetic write head 502 in electrical equivalent circuit form for writing data to a magnetic storage medium 504 by producing magnetic flux at a write gap 508. As shown, the electrical equivalent circuit of write head 502 includes an alternating current (AC) source which represents the magnetomotive force generated by the write coil. It also includes two units of a core reluctance $R_c$, which together represent the magnetic resistance (or "reluctance") of the magnetic core. The write gap reluctance is represented by $R_g$. The magnetic core transports magnetic flux (represented by current I) generated by the write coil to the front pole tips and write gap 508.

The electrical equivalent circuit also includes a low frequency shunt 506. Low frequency shunt 506 has a higher magnetic reluctance at high frequencies than at low frequencies, which allows little (if any) magnetic flux to flow through it at high frequencies. At low frequencies, low frequency shunt 506 shunts magnetic flux excess away from the write gap or $R_g$. Thus, magnetic flux excess is advantageously reduced at low data rates to reduce interference, but not at high data rates where greater magnetic flux is needed for sufficient writing. Low frequency shunt 506 may be considered or referred to as a low frequency attenuator in write head 502, and may also be considered as a frequency-dependent variable magnetic resistor.

Figure 1:
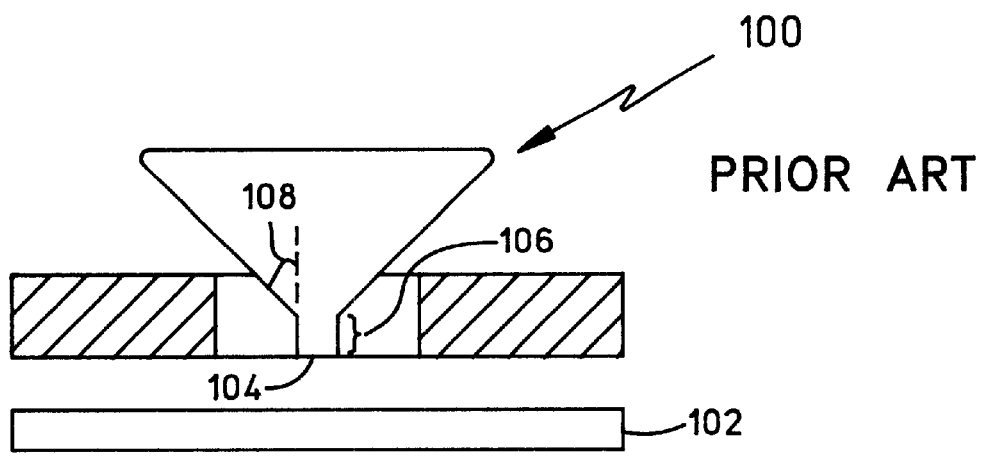
FIG. 1 is a planar view of a prior art magnetic write head, where the driving coil is omitted from the diagram for clarity.
Figure 2:
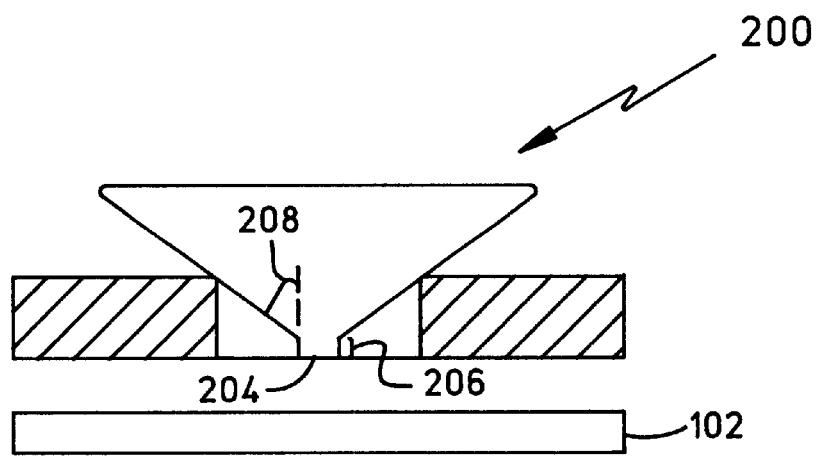
FIG. 2 is a planar view of a magnetic write head configured for writing data at high data rates, where the driving coil is omitted from the diagram for clarity.
Figure 3:
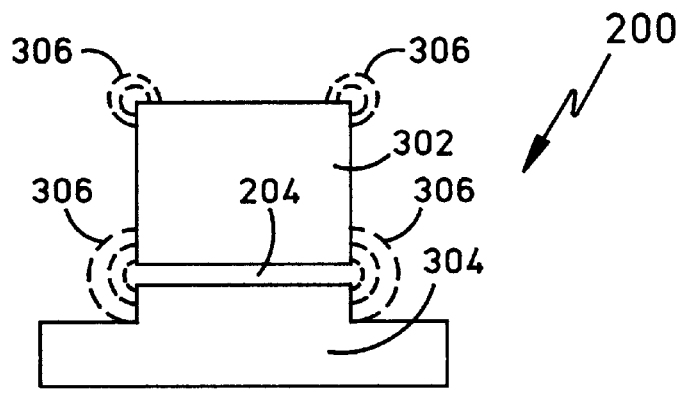
FIG. 3 is a pole tip view of the magnetic write head of FIG. 2, showing the excessive fringing field due to which adjacent track interference (ATI) may occur when writing data at low data rates.
Figure 4A:
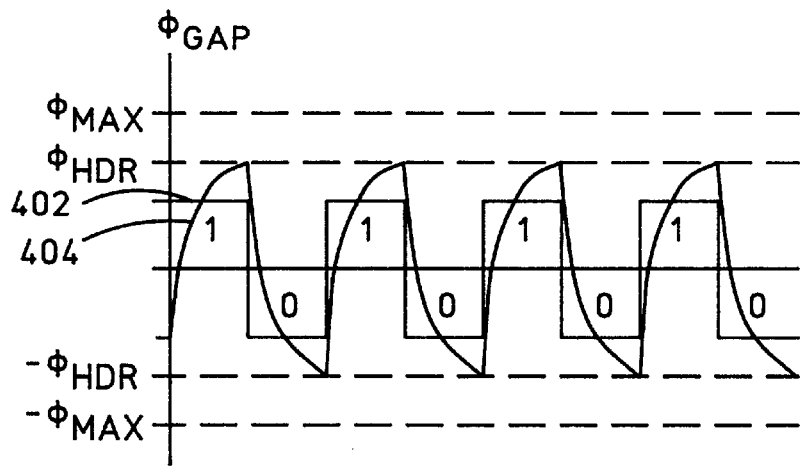
FIGS. 4A–4C are timing diagrams which help explain the interference which may be produced by the magnetic write head of FIGS. 2 and 3 when writing at low data rates.
Figure 4B:
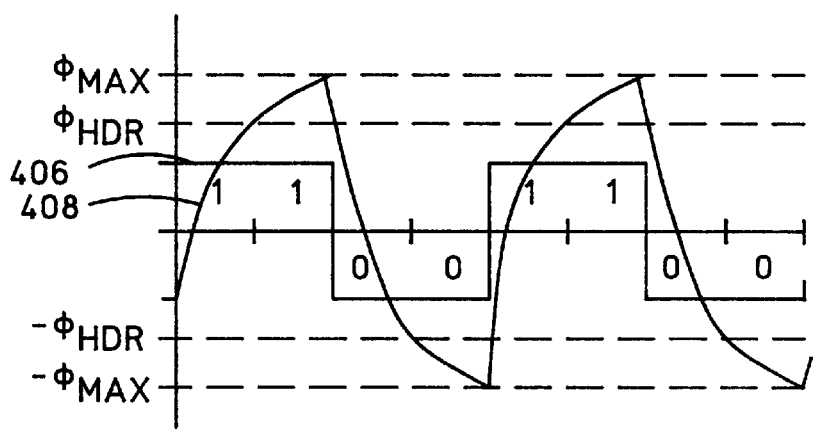
Figure 4C:
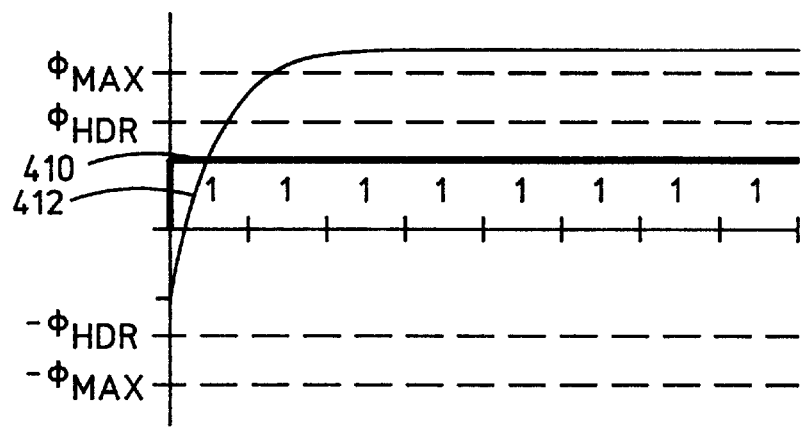
Figure 6:
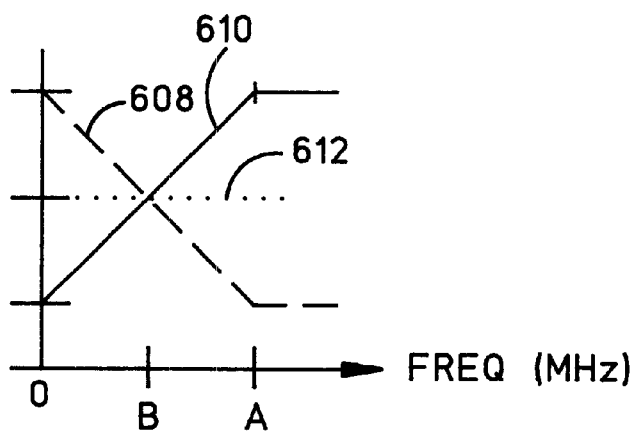
FIG. 6 shows examples of frequency response curves related to the magnetic write heads of FIGS. 2–3, 5, 7–8, and 10–14.

FIG. 6 shows a frequency response curve 608 (shown as a dashed line) of write head 200 of FIGS. 2–3 and/or of write head 502 of FIG. 5 without low frequency shunt 506; a frequency response curve 610 (shown as a solid line) that is associated with the filtering effect that low frequency shunt 506 has on write head 502 of FIG. 5; and a resulting frequency response curve 612 (shown as a dotted line) of write head 502 of FIG. 5. As illustrated by frequency response curve 610 of FIG. 6, with use of low frequency shunt 506 of FIG. 5, signals having frequencies or data rates below "A" MHz (such as frequencies or data rates at "B" MHz or at DC) are reduced at the write gap, whereas signals having frequencies or data rates at or above "A" MHz are not so reduced. In one specific example, A=500 MHz and B=250 MHz.

In the embodiment shown, frequency response curve 610 is mostly a linear function having a positive slope for offsetting the negative slope of the linear function of frequency response curve 608. Thus, a resulting flat linear response having a zero slope is produced, as illustrated by resulting frequency response curve 612. In a slightly varied example, frequency response curves 608 and 610 may be continuously linear over the entire operating frequency range of write head 502. These curves illustrate ideal responses, but of course may be non-ideal or varied in practice as one skilled in the art will readily understand. For example, a more realistic model of frequency response curve 608 may be one that is based on a mathematical function where the level is inversely proportional to the square root of frequency at the high frequency limit.

Figure 7:
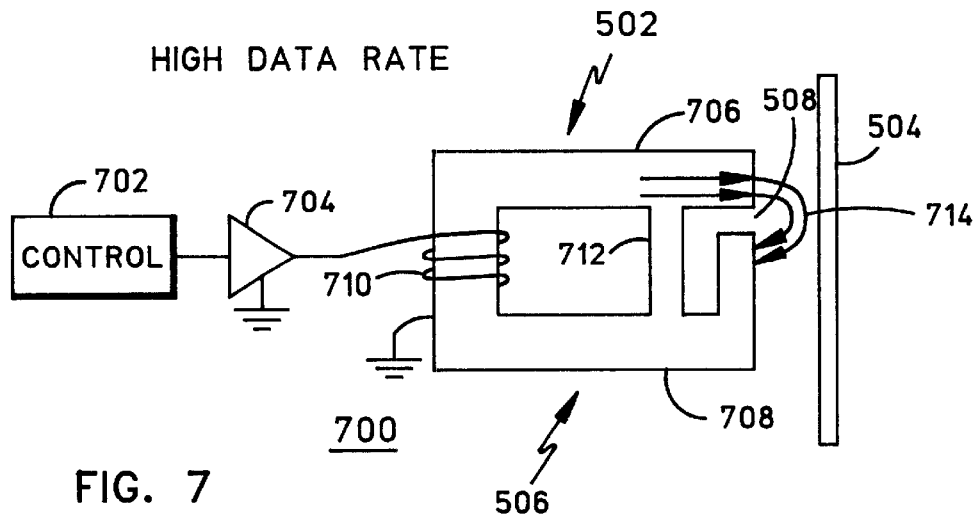
FIG. 7 is a longitudinal cross-sectional view of a magnetic recording apparatus which utilizes the magnetic write head of FIGS. 5–6, indicating operation at high data rates; the magnetic permeability of the magnetic shunting element is low at high data rates due to its geometric dimensions, so little (if any) flux is shunted through the magnetic shunting element away from the write gap.

FIG. 7 is an illustration of a magnetic recording apparatus 700, such as that used in a disk drive, which includes write head 502 described in relation to FIGS. 5 and 6. Magnetic recording apparatus 700 includes a controller 702, a write driver 704, write head 502, and magnetic coils 710. Controller 702 has an output coupled to an input of write driver 704 for sending data to write driver and controlling the write operation to storage medium 504. Write driver 704 has an output coupled to magnetic coils 710. Controller 702 may be any suitable controller(s) and/or processor(s), and write driver 704 may be of any conventional type.

Write head 502 is suitable for use in a disk drive or any other suitable magnetic recording apparatus. Write head 502 may be used solely for writing data to storage medium 504, or could be used for both writing to and reading from storage medium 504 (i.e. as a merged read/write head). Write head 502 is formed by a pole piece 706 (e.g., P2) and a pole piece 708 (e.g., P1), which together form write gap 508. Note that it is the magnetic field (or "fringing" field) across write gap 508 that is responsible for writing data on storage medium 504. The magnetic circuit formed by pole pieces 706 and 708 is magnetically coupled to and thus driven by magnetic coils 710 as is conventional.

Write head 502 is physically configured such that it can sufficiently write data to storage medium 504 at high data rates, as was described in relation to FIG. 2. By "sufficiently write" it is meant that write head 502 has a sufficient overwrite capability at the given high data rate. The high data rate may be, for example, a data rate greater than or equal to 500 MHz. For 500 MHz operation, the flare point of write head 502 may be within the range of 0.5–1.0 $\mu$m and the flare angle of write head 502 may be greater than or equal to 45° (e.g., 60°). Preferably, write head 502 is configured to sufficiently write data to storage medium 504 at 1 Gigabit/Sec or higher.

Write head 502 also includes a magnetic shunting element 712 which extends between pole pieces 706 and 708. Magnetic shunting element 712 is positioned in front of magnetic coils 710 and directly behind and in parallel with write gap 508 (i.e., behind the throat). The terminology "in parallel" is used herein in the magnetic sense and in terms of magnetic flux circuit flow. In a thin-film head used for hard disk drives, magnetic coils 710 are preferably configured in a conventional "pancake" form where magnetic shunting element 712 is positioned directly in front of the first coil winding. This configuration will be described later in more detail in relation to FIG. 14.

Preferably, magnetic shunting element 712 has a shape of a long and narrow column. For example, the ratio of length-to-width of magnetic shunting element 712 may be about 2-to-1. Also preferably, this ratio is at least 2-to-1. However, many other ratios are suitable and will depend on the specific requirements and results desired.

As described earlier, the ratio of length-to-width will control the rate at which the magnetic permeability of magnetic shunting element 712 decreases with increasing operating frequency (i.e., its permeability "frequency roll-off"). The smaller the permeability of magnetic shunting element 712 at a given frequency, the smaller the amount of magnetic flux that is shunted away from write gap 508 (i.e. the more magnetic flux that is allowed to reach write gap 508). As described above, this aspect-ratio is selected during the design stage to tailor the frequency roll-off characteristic to specific product requirements.

Preferably, magnetic shunting element 712 is integrally formed with pole pieces 706 and 708 and uses the same material as that in pole pieces 706 and 708. While using the same magnetic material for magnetic shunting element 712 and pole pieces 706 and 708 is not necessary for proper functioning, it is nevertheless advantageous for wafer-processing as it enables write head 502 to be manufactured with fewer processing steps than would otherwise be necessary, thereby shortening product cycle time. As examples of materials, magnetic shunting element and pole pieces 706 and 708 may be made from a nickel-iron alloy or a cobalt-nickel-iron alloy.

Within write head 502, magnetic shunting element 712 behaves or serves as the low frequency shunt 506 (FIGS. 5 and 6) in magnetic recording apparatus 700. Without magnetic shunting element 712, magnetic recording apparatus 700 has a linear frequency response with a negative slope as described in relation to FIG. 6 (e.g. frequency response curve 608). With magnetic shunting element 712, magnetic recording apparatus 700 has a substantially flat response also as described in relation to FIG. 6 (e.g. frequency response curve 612).

Figure 8:
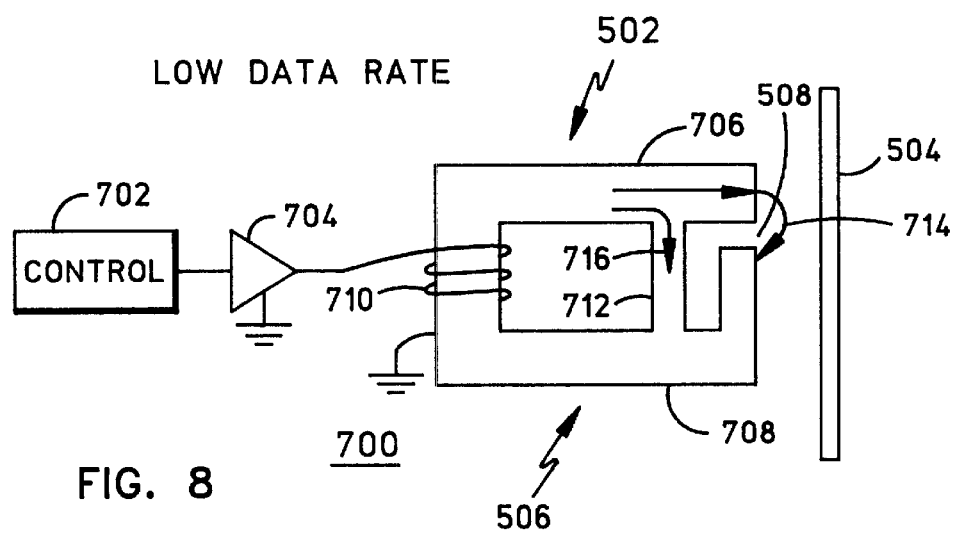
FIG. 8 is a longitudinal cross-sectional view of the magnetic recording apparatus which utilizes the magnetic write head of FIGS. 5–6, indicating operation at low data rates; the magnetic permeability of the magnetic shunting element is relatively higher at low data rates, so magnetic flux excess is shunted through the magnetic shunting element to reduce the magnetic flux across the write gap.
Figure 9:
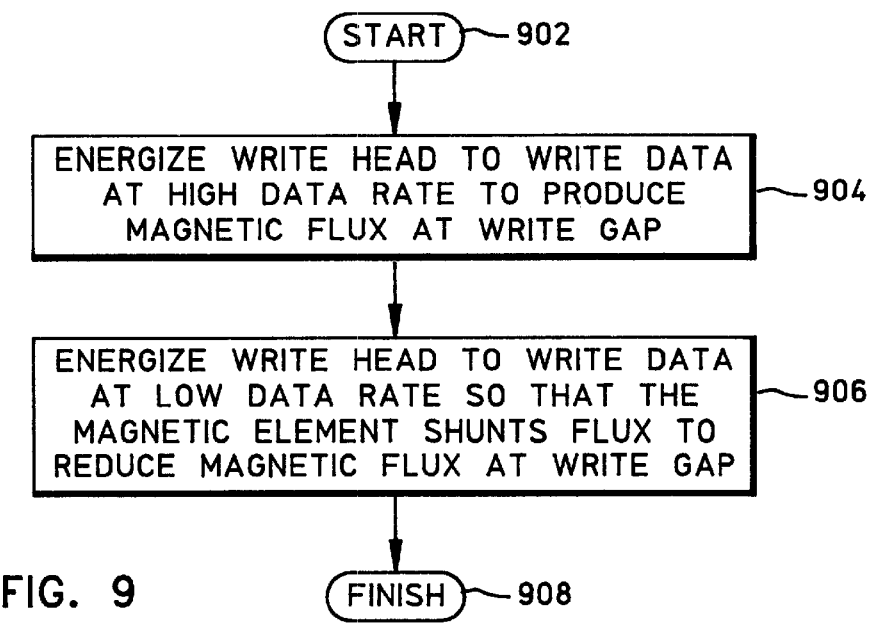
FIG. 9 is a flowchart describing a method of writing data to a disk utilizing the magnetic recording apparatus of FIGS. 5 and 7–8.

As the description in relation to FIGS. 7, 8, and 9 will reveal, magnetic recording apparatus 700 can write data to storage medium 504 at a high data rate (as illustrated in FIG. 7) and at a low data rate (as illustrated in FIG. 8) with optimal results.

FIG. 9 is a flowchart describing a method of writing data to a storage medium with magnetic recording apparatus 700 of FIGS. 7 and 8, which will now be described. This described method may be invoked by the end-user of magnetic recording apparatus 700. The flowchart of FIG. 9 describes a simple method of data recording so that the reader can gain an understanding of the present invention; in actual practice, the frequencies at which data is written depends on the varying nature of the actual data sequences to be stored on the storage medium. However, the methods described herein can indeed be used to determine whether or not a device is actually practicing according to principles of the present invention.

Referring to FIGS. 7 and 9 in combination, and beginning at a start block 902 of FIG. 9, write head 502 of FIG. 7 is energized so that data is written at a high data rate to produce a magnetic flux 714 at write gap 508 (step 904 of FIG. 9). In this step, controller 702 feeds write driver 704 with high speed data, instructing write driver 704 to energize magnetic coils 710 appropriately with a write current so that the high speed data will be written to storage medium 504. As shown in FIG. 7, magnetic flux 714 that is sufficient to write the high speed data on storage medium 504 is generated at write gap 508, but little if any magnetic flux is shunted by magnetic shunting element 712 (at least relative to the low data rate operation). Little if any shunting occurs due to the low magnetic permeability (or high reluctance) of magnetic shunting element 712 at high frequencies.

Referring now to FIGS. 8 and 9 in combination, write head 502 of FIG. 8 is energized so that data is written at a low data rate such that magnetic shunting element 712 shunts magnetic flux excess 716 to reduce magnetic flux 714 produced at write gap 508 (step 906 of FIG. 9). In this step, controller 702 feeds write driver 704 with low speed data, instructing write driver 704 in energize magnetic coils 710 appropriately with the write current so that the low speed data will be written to storage medium 504. As shown in FIG. 8, magnetic flux 714 that is sufficient to write the low speed data on storage medium 504 is generated at write gap 508, but is desirably reduced as magnetic flux excess 716 is shunted by magnetic shunting element 712. This reduction is desirable because, without magnetic shunting element 712, the magnetic flux at write gap 508 would be much higher at low frequencies than it would be at high frequencies. Magnetic shunting element 712 is able to shunt magnetic flux excess 716 from write gap 508 at low frequencies because of its relatively high permeability (or low reluctance) at low frequencies. The flowchart ends at a finish block 908 of FIG. 9.

FIGS. 10, 11, 12, and 13 are alternate embodiments of magnetic recording apparatus 700 of FIGS. 5–8. In these figures, elements which appear similar or the same as those previously shown are indeed similar or the same elements. Using FIGS. 10–13 or other similar variations, the same or similar suitable results are achieved as shown and as described above in relation to FIGS. 5–9.

Figure 10:
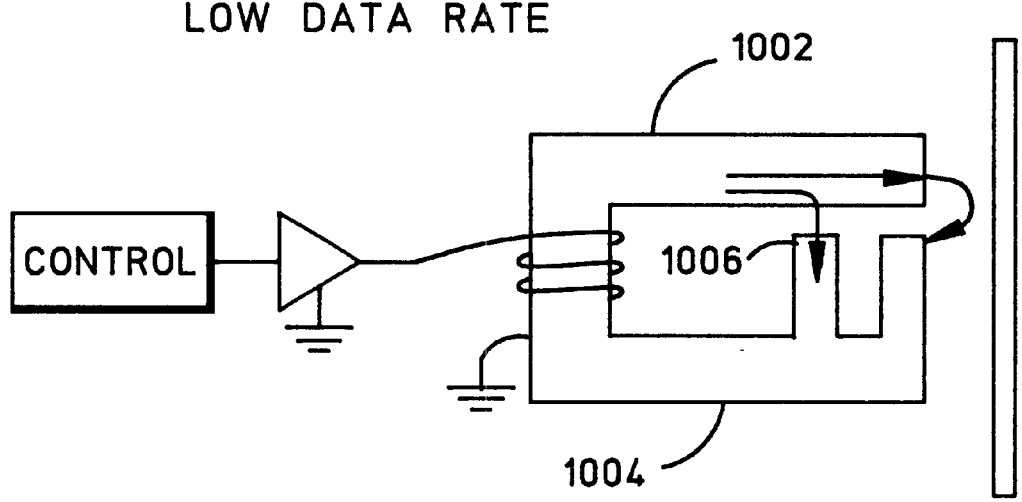
FIG. 10 is an alternate embodiment of a magnetic recording apparatus according to the present invention.
Figure 11:
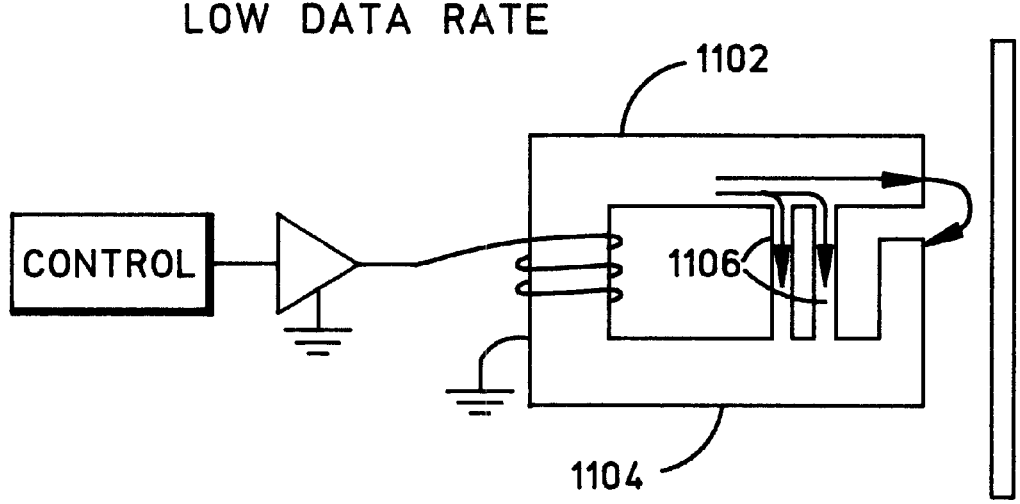
FIG. 11 is another alternate embodiment of a magnetic recording apparatus according to the present invention.

In FIG. 10, a magnetic recording apparatus has a pole piece 1002 (e.g., P2), a pole piece 1004 (e.g., P1), and a magnetic shunting element 1006 which extends from pole piece 1004 towards but not physically connecting with pole piece 1002. Magnetic shunting element 1006 and pole piece 1002 form a gap which is in alignment with the write gap; this configuration may be more convenient for wafer processes for it will require fewer wafer-processing steps, thereby shortening product cycle time. In FIG. 11, a magnetic recording apparatus has a pole piece 1102 (e.g., P2), a pole piece 1104 (e.g., P1), and two thinner magnetic shunting elements 1106 extending between pole pieces 1102 and 1104 as shown.

Figure 12:
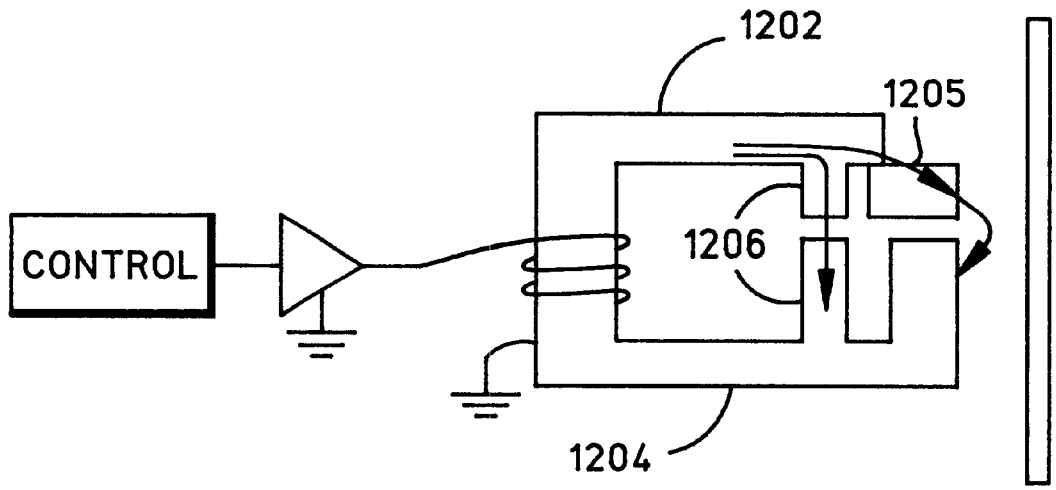
FIG. 12 is yet another alternate embodiment of a magnetic recording apparatus according to the present invention.

A magnetic recording apparatus of FIG. 12 has a pole piece 1202 (e.g., P3), a pole piece 1204 (e.g., P1), a pole piece 1205 (e.g., P2), and two magnetic shunting elements 1206. In this case, pole piece 1202 forms the relatively wide magnetic core and pole piece 1205 functions as one of the pole tips. The two magnetic shunting elements 1206 include one magnetic shunting element that extends from pole piece 1204 towards but not physically connecting with another magnetic shunting element that extends from pole piece 1202 towards it. As illustrated, the two magnetic shunting elements 1206 form a gap which is in alignment with the write gap. Again, configurations such as this one and the one in FIG. 10 (i.e., with a gap formed in the magnetic shunting element which is in alignment with the write gap) may be more practical from the standpoint of wafer processing.

Figure 13:
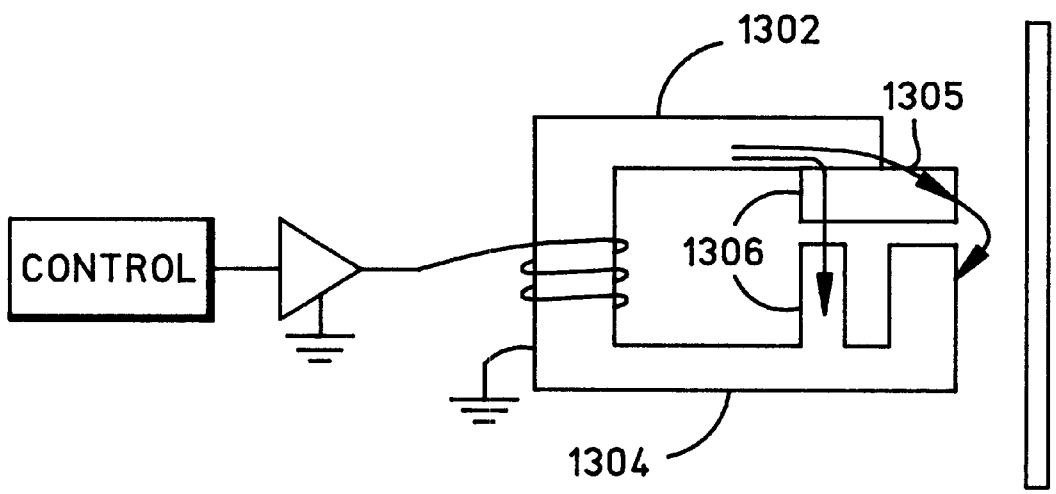
FIG. 13 is even another alternate embodiment of a magnetic recording apparatus according to the present invention.

FIG. 13 shows a magnetic recording apparatus having a pole piece 1302 (e.g., P3), a pole piece 1304 (e.g., P1), a pole piece 1305 (e.g., P2), and two magnetic shunting elements 1306, one of which is formed together with pole piece 1305. Here, pole piece 1302 forms the magnetic core and pole piece 1305 forms one of the pole tips. As illustrated, the two magnetic shunting elements 1306 include one magnetic shunting element that extends from pole piece 1304 towards but not physically connecting with another magnetic shunting element formed from pole piece 1305 that extends from pole piece 1302 towards it. The two magnetic shunting elements 1306 form a gap which is in alignment with the write gap.

Figure 14:
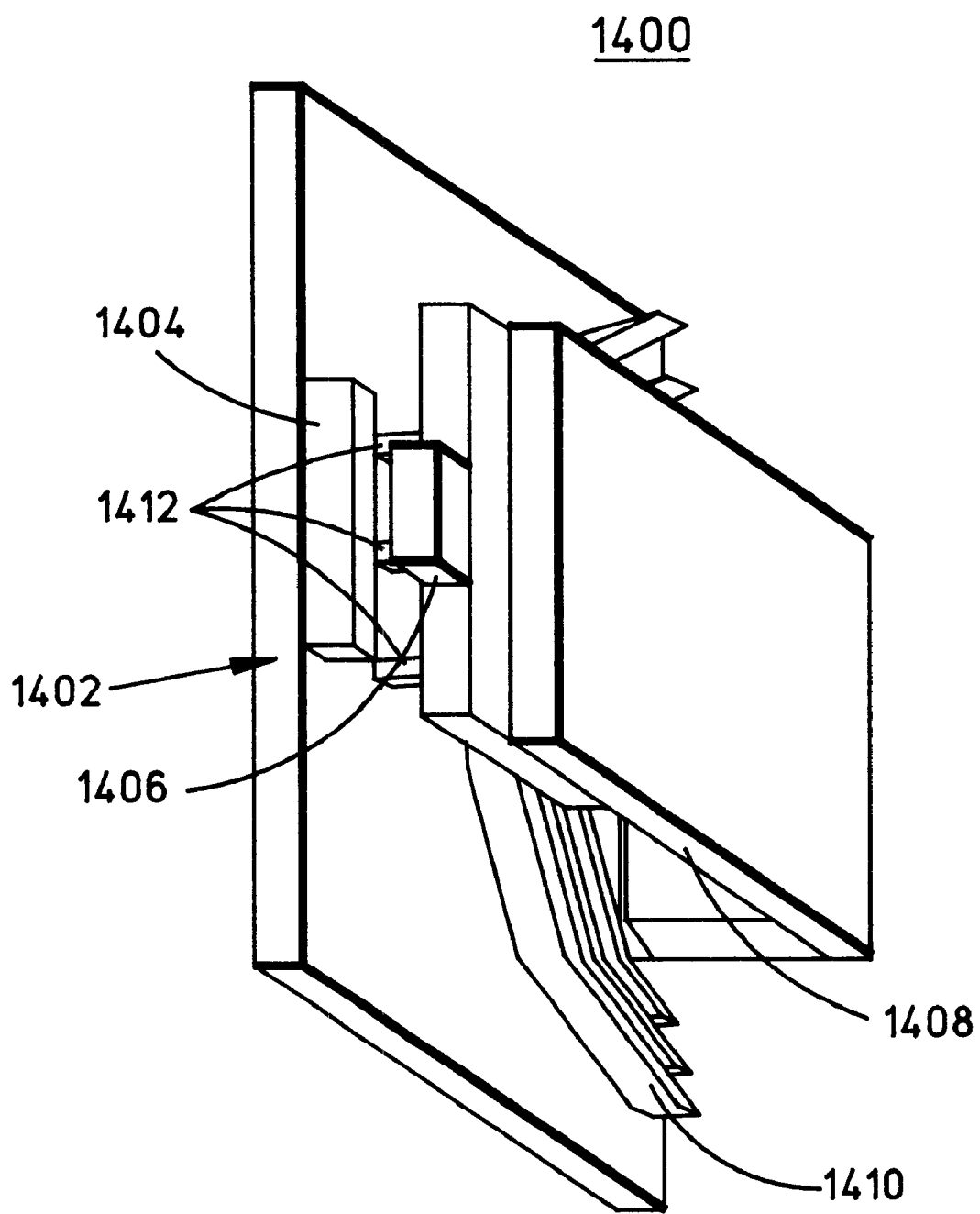
FIG. 14 is a perspective view of the structure of a magnetic write head in accordance with another embodiment of the present invention (which includes a partial view of the driving coil).

FIG. 14 shows a perspective view of the structure of another magnetic write head 1400 having coils in the conventional "pancake" form previously referred to. Magnetic write head 1400 has a pole piece 1402 (e.g., P1), a pole piece 1404 (e.g., P1-Pedestal), a pole piece 1406 (e.g., P2), a pole piece 1408 (e.g., P3), magnetic coils 1410 (only partially illustrated for clarity), and magnetic shunting elements 1412. Again, the same or similar suitable results are achieved as shown and as described above in relation to FIGS. 5–9.

Thus, as described above, a magnetic head configured for high data rate operation has first and second pole pieces, a write gap formed between the first and second pole pieces, and at least one magnetic shunting element extending between the first and second pole pieces which is magnetically in parallel with the write gap. The at least one magnetic shunting element serves as a low frequency attenuator in the magnetic head.

The magnetic head is configured to write data at a high data rate where a magnetic flux is produced at the write gap to sufficiently write data on the storage medium, and configured to write data at a low data rate where the at least one magnetic shunting element shunts magnetic flux excess so that a reduced magnetic flux is produced at the write gap. This reduced low frequency or DC flux does not exceed a maximum flux level beyond which excessive side-writing or ATI would otherwise begin to occur.

For high-frequency write operation, the first and the second pole pieces preferably form a flare angle greater than or equal to 45°. Also preferably, the low frequency attenuator is configured to pass signals having frequencies at or above 500 MHz (at the present state-of-the-art) and to reduce signals having frequencies at or below 250 MHz.

The at least one magnetic shunting element may be a single magnetic shunting element having a length-to-width ratio of about, but not limited to, 2-to-1. In practice, this aspect-ratio is selected during the design stage to tailor the frequency roll-off characteristic to the particular requirements of the product The at least one magnetic shunting element may also be integrally formed with the first or second pole pieces and have a material that is the same as a material in the first or second pole pieces. While using the same material is not necessary for proper functioning of the magnetic head, it is advantageous during wafer processing as it allows for fewer processing steps than would otherwise be necessary.

In another aspect of the present invention, a method of writing data to a storage medium with a magnetic head involves a magnetic write head having first and second pole pieces forming a write gap and one or more magnetic shunting elements extending between the first and the second pole pieces which are magnetically in parallel with the write gap. The method involves the acts of energizing the magnetic head with a write current to write data at a high data rate such that a magnetic flux is produced at the write gap, and energizing the magnetic head with the write current to write data at a low data rate such that the one or more magnetic shunting elements shunt magnetic flux excess to reduce the magnetic flux produced at the write gap.

Preferably, the act of energizing to write data at the high data rate involves a high data rate that is equal to a maximum allowable data rate of the recording apparatus, and the act of energizing to write data at the low data rate involves a low data rate that is less than or equal to half of the maximum allowable data rate. More particularly, the act of energizing to write data at the high data rate involves a high data rate at or above 500 MHz (the present stage of magnetic storage) and the act of energizing to write data at the low data rate involves a low data rate at or below 250 MHz.

When such a magnetic disk recording apparatus is provided for use to an end-user (e.g., where the manufacturer of the magnetic disk recording apparatus provides it to the end-user), the method may involve the following related steps: providing for energization of the magnetic head with a write current to write data at a high data rate so that a magnetic flux is produced at the write gap; and providing for energization of the magnetic head with the write current to write data at a low data rate so that the at least one magnetic shunting element shunts magnetic flux excess to reduce the magnetic flux produced at the write gap.

Advantageously, what is invented is a magnetic write head apparatus that has the ability to sufficiently write data at high data rates while producing minimal side-writing and adjacent track interference when writing data at low data rates. It is to be understood that the above is merely a description of preferred embodiments of the invention and that various changes, alterations, and variations may be made without departing from the true spirit and scope of the invention as set for in the appended claims. The present invention may be employed in, for example, stitched as well as non-stitched writers. The application of the invention is also not limited to hard disk drives; for example, another application is a tape drive. None of the terms or phrases in the specification and claims has been given any special particular meaning different from the plain language meaning to those skilled in the art, and therefore the specification is not to be used to define terms in an unduly narrow sense.

What is claimed is:

1. A magnetic head which is driven at a maximum operating data rate and at other data rates below the maximum operating data rate, the magnetic head comprising:
   first and second pole pieces;
   at least one magnetic shunting element extending between the first and second pole pieces which is magnetically in parallel with a write gap;
   the at least one magnetic shunting element comprising a low frequency write flux attenuator;
   the at least one magnetic shunting element being configured to shunt little if any magnetic flux at the maximum operating data rate so that a sufficient magnetic write flux is produced at the write gap for writing data; and
   the at least one magnetic shunting element being configured to shunt magnetic flux at the other data rates so that a reduced magnetic write flux is produced at the write gap for writing data.

2. The magnetic head of claim 1, wherein the maximum operating data rate is greater than or equal to 500 MHz.

3. The magnetic head of claim 1, wherein the at least one magnetic shunting element is integrally formed with the first or second pole pieces and comprises a material that is the same as a material in the first or second pole pieces.

4. The magnetic head of claim 1, wherein the at least one magnetic shunting element forms a gap that is in alignment with the write gap.

5. The magnetic head of claim 1, wherein the maximum operating data rate is 500 MHz or more and the other data rates are less than ½ of the maximum operating data rate.

6. The magnetic head of claim 1, wherein the at least one magnetic shunting element is magnetically coupled between the first and the second pole pieces.

7. The magnetic head of claim 1, wherein the magnetic head is physically configured for high data rate operation.

8. A magnetic head for writing data to one or more disks, the magnetic head comprising:
   at least first and second pole pieces;
   a write gap between the first and the second pole pieces;
   the at least first and second pole pieces forming a flare angle greater than or equal to 45°;
   one or more magnetic shunting elements extending between the first and the second pole pieces;
   the one or more magnetic shunting elements including a magnetic shunting element having a length-to-width ratio of at least 2-to-1;
   the magnetic head being configured to write data at a high data rate during which a magnetic write flux is formed at the write gap and the one or more magnetic shunting elements shunt little if any magnetic write flux; and
   the magnetic head being configured to write data at a low data rate during which the one or more magnetic shunting elements shunt magnetic write flux excess so that a reduced magnetic write flux is formed at the write gap.

9. The magnetic head of claim 8, wherein the one or more magnetic shunting elements are integrally formed with the first or second pole pieces and comprise a material that is the same as a material in the first or second pole pieces.

10. The magnetic head of claim 8, wherein the one or more magnetic shunting elements form a gap that is in alignment with the write gap.

11. The magnetic head of claim 8, wherein the one or more magnetic shunting elements comprise a low frequency write flux attenuator in the magnetic head.

12. The magnetic head of claim 8, wherein the high data rate comprises a maximum operating data rate of the magnetic head and the low data rate comprises half of the maximum operating data rate or less.

13. A magnetic recording apparatus, comprising:
   first and second pole pieces;
   a write gap formed between the first and second pole pieces;
   at least one magnetic shunting element extending between the first and second pole pieces which is magnetically in parallel with the write gap;
   magnetic coils coupling to the first and second pole pieces;
   a write driver coupled to the magnetic coils;
   the write driver configured to cause the magnetic head to write data at a maximum operating data rate where the magnetic coils are energized with a write current such that a magnetic flux is produced at the write gap and the at least one magnetic shunting element shunts little if any magnetic flux; and
   the write driver configured to cause the magnetic head to write data at other data rates less than the maximum operating data rate where the magnetic coils are energized with the write current such that the at least one magnetic shunting element shunts magnetic flux excess to produce a reduced magnetic flux at the write gap.

14. The magnetic recording apparatus of claim 13, wherein the at least one magnetic shunting element is integrally formed with the first or the second pole pieces and comprises a material that is the same as a material in the first or the second pole pieces.

15. The magnetic recording apparatus of claim 13, wherein the at least one magnetic shunting element forms a gap that is in alignment with the write gap.

16. The magnetic recording apparatus of claim 13, wherein the at least one magnetic shunting element comprises a low frequency write flux attenuator.

17. The magnetic recording apparatus of claim 13, wherein the maximum operating data rate is at or above 500 MHz and the other data rates are at or below 250 MHz.

18. The magnetic recording apparatus of claim 13 wherein the first and the second pole pieces form a flare angle that is greater than or equal to 45° and/or a flare point that is about 1.0 µm so as to be physically configured for high data rate operation.

19. A method of providing for energization of a magnetic head for writing data to a storage medium, the magnetic head comprising first and second pole pieces forming a write gap and at least one magnetic shunting element extending between the first and the second pole pieces which is magnetically in parallel with the write gap, the method comprising the acts of:
   providing for energization of the magnetic head with a write current to write data at a high data rate such that a magnetic flux is produced at the write gap and little if any magnetic flux is shunted by the at least one magnetic shunting element; and
   providing for energization of the magnetic head with the write current to write data at a low data rate such that the at least one magnetic shunting element shunts magnetic flux excess to reduce the magnetic flux produced at the write gap.

20. The method according to claim 19, wherein the act of providing for energization of the magnetic head to write data at the low data rate comprises shunting the magnetic flux excess to avoid adjacent track interference (ATI).

21. The method according to claim 19, wherein the act of providing for energization of the magnetic head to write data at the high data rate comprises a high data rate at or above 500 MHz, and the act of providing for energization of the magnetic head to write data at the low data rate comprises a low data rate at or below 250 MHz.

22. The method according to claim 19, wherein the act of providing for energization of the magnetic head to write data at the high data rate comprises a high data rate that is equal to a maximum allowable data rate, and the act of providing for energization of the magnetic head to write data at the low data rate comprises a low data rate that is less than or equal to half of the maximum allowable data rate.

23. The method according to claim 19, wherein the first and the second pole pieces form a flare angle that is greater than or equal to 45° and/or a flare point that is about 1.0 µm so as to be physically configured for high data rate operation.

* * * * *